No. 818,192. PATENTED APR. 17, 1906.
C. RANSON.
PROCESS OF MANUFACTURING CAUSTIC ALKALIES AND ZINC SULFID.
APPLICATION FILED OCT. 3, 1904.
2 SHEETS—SHEET 1.
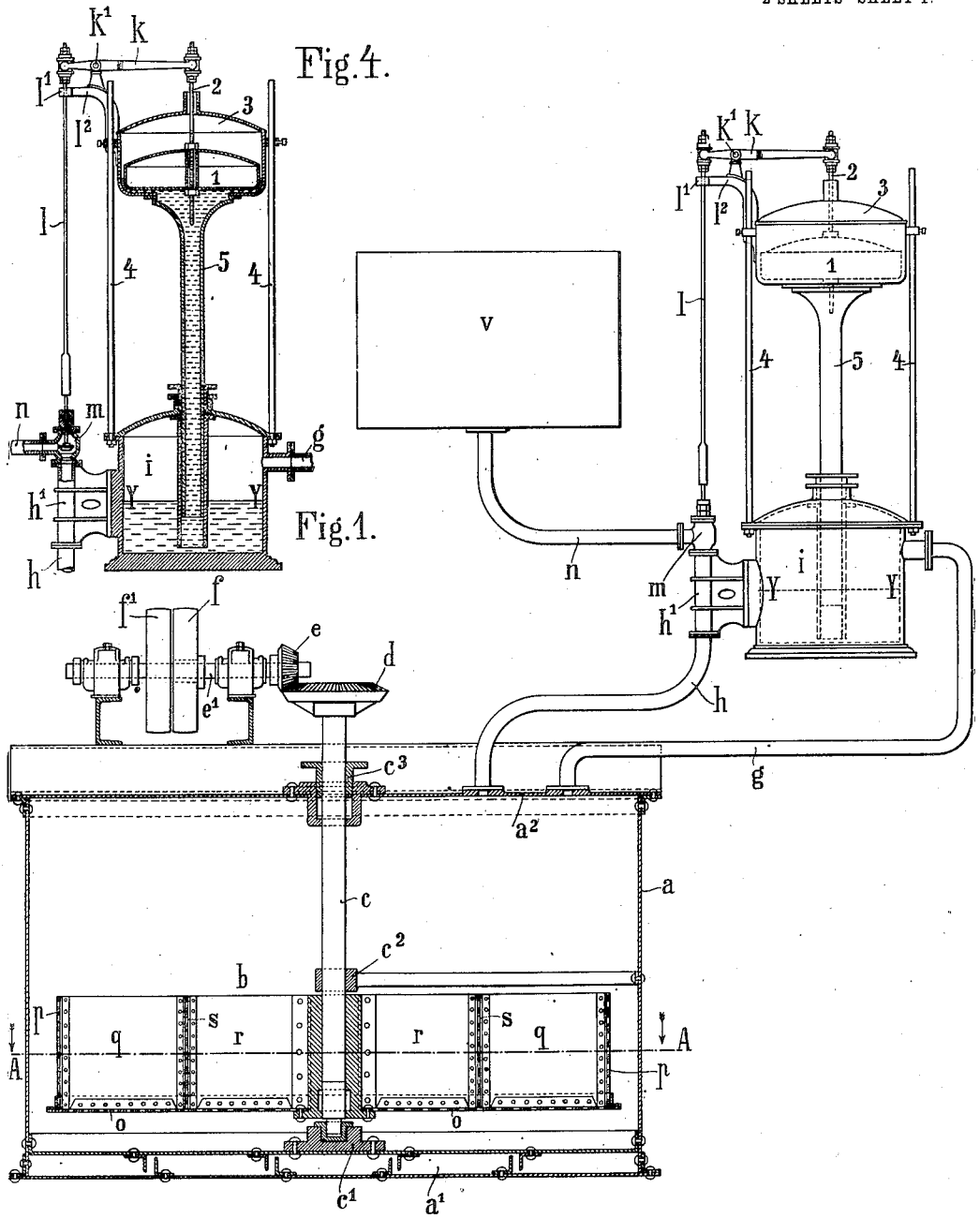

No. 818,192. PATENTED APR. 17, 1906.
C. RANSON.
PROCESS OF MANUFACTURING CAUSTIC ALKALIES AND ZINC SULFID.
APPLICATION FILED OCT. 3, 1904.
2 SHEETS—SHEET 2.
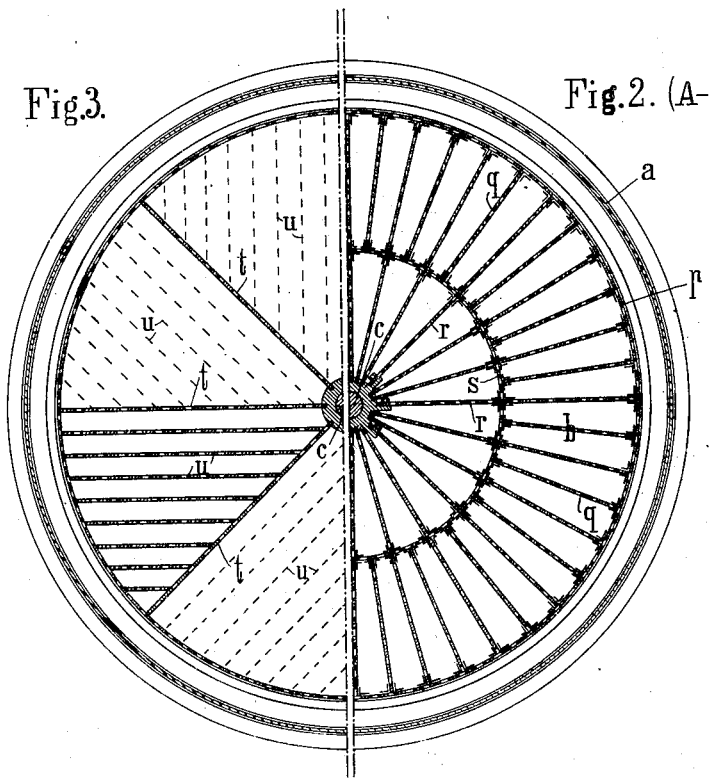
Fig.3.   Fig.2. (A—A).

UNITED STATES PATENT OFFICE.

CHARLES RANSON, OF BRUSSELS, BELGIUM, ASSIGNOR TO HENRY WILLIAM DE STUCKLÉ, OF DIEUZE, GERMANY.

PROCESS OF MANUFACTURING CAUSTIC ALKALIES AND ZINC SULFID.

No. 818,192.	Specification of Letters Patent.	Patented April 17, 1906.

Application filed October 3, 1904. Serial No. 227,075.

*To all whom it may concern:*

Be it known that I, CHARLES RANSON, a citizen of France, residing at Brussels, Belgium, have invented certain new and useful Improvements in Processes of Manufacturing Caustic Alkalies and Zinc Sulfid, of which the following is a specification.

The present invention relates to the manufacture of caustic alkalies or alkali hydrates, such as potassium or sodium hydrate, the object of the said invention being to furnish a method of obtaining these alkali compounds in an economical manner from readily-available starting materials and so that commercially valuable by-products will result.

With these objects in view the invention involves the treatment of alkali sulfid with zinc in the presence of alkali hydrate. This treatment, as has been found by the inventor leads to the very advantageous and important result that coincidently with the production of the alkali hydrates zinc sulfid of a fineness and purity hitherto unattainable is obtained.

My invention also involves the features and steps hereinafter to be described.

Under this invention the zinc and alkali hydrate react upon each other in the presence of alkali sulfid. The evolution of hydrogen due to such reaction therefore always takes place in the presence of such alkali sulfid. This is of special importance for the production of the final products, because in this manner, as I have found, it alone becomes possible to obtain zinc sulfid of superior quality, which by virtue of the evolution of hydrogen which continually takes place during its formation is obtained in a finely-divided state and in copious volume. It is therefore more valuable as paint or pigment and forms a more effective coating than zinc sulfid which has been precipitated without such evolution of hydrogen. This is not the only useful result due to the evolution of hydrogen; but the same can be utilized to perform the further useful function of regulating the progress of the process in such a way as to render the same continuous and without interruption. The development of hydrogen furnishes a very convenient means for ascertaining at all times whether or not alkali sulfid is present in excess. It is to be observed that such excess must be carefully avoided, since otherwise the regular progress of the reaction would be interrupted and the continuity of the same rendered impossible, whereby an inferior final product would result.

Under my invention, it should be observed, alkali hydrate is continually regenerated simultaneously with the formation of zinc sulfid. If now more alkali sulfid is present than necessary for the formation of zinc sulfid, the alkali sulfid is decomposed in the hot solution, such decomposition being accompained by the evolution of hydrogen-sulfid gas. This hydrogen sulfid reacts upon the alkali hydrate present, forming sulfid and sulfhydrate of the alkali and consumes the alkali hydrate, which is a very undesirable result, for the reason that thereby such alkali hydrate is diverted from its proper function of dissolving zinc and developing hydrogen. Moreover, the sulfhydrates thus formed are easily decomposed, and thereby color the precipitated zinc sulfid yellow, thus rendering it worthless. The proper addition of the alkali sulfid is also of importance, for the reason that if the alkali sulfid is not added while undecomposed alkali hydrate is present in the receptacle in which the reaction takes place the continuity of the operation will be interrupted.

In order that the evolution of hydrogen is continuous and is never interrupted, an excess of zinc is employed. In consequence of this excess of zinc the primarily-formed alkali hydrate will always be in presence of zinc to be dissolved, so that a continuous formation of zinc-alkali oxid takes place. Hence the alkali sulfid can continually react upon zinc-alkali oxid, and thus the continuity of the operation is maintained.

In order to utilize the evolution of hydrogen as a regulator of the amount of alkali sulfid to be added, the starting materials are treated in an air-tight closed receptacle for the purpose of retaining and measuring the developed hydrogen. The observation of the amount of hydrogen formed furnishes a criterion for the proper progress of the reaction and for determining the period at which further quantities of alkali sulfid are to be added. The evolution of hydrogen may serve not only as an indicator but also as a means for operating automatic mechanism for regulating the supply of the alkali sulfid to the receptacle in which the reaction takes place.

In order to maintain the uninterrupted evolution of hydrogen, and hence the continuity of the reaction, it is necessary to prevent the deposition of the fine particles of zinc sulfid which are suspended in the liquid upon the metallic zinc and covering the same with an isolating layer, which would render the solution of metallic zinc difficult, if not impossible. For this purpose the receptacle in which the reaction takes place is provided with an agitating device to which the continuous movement can be imparted and which at the same time is so arranged that the metallic zinc may be distributed over a large surface. One way of carrying this into effect is by placing the metallic zinc in a divided or granular form into an iron receiver or drum mounted upon a rotary shaft. By revolving the receiver the necessary agitating or stirring effect is obtained. In order that the zinc sulfid is not permanently deposited upon the zinc, but remains in suspension or is carried off after being formed for the purpose of continuously presenting new metallic surfaces to the reaction liquid, the receiver or drum is formed of a perforated or foraminated bottom and similar walls, so as to present substantially the shape of a dished strainer. Under such a construction the reaction liquid will flow toward and over the zinc from all sides and carry off the deposit. In order to facilitate the penetration of the reaction liquid between the zinc particles, the interior of the dished foraminated iron drum is divided into a number of compartments by iron perforated or foraminated partition-walls. By such a construction the liquid can pass from one compartment to the other, and, moreover, the surface of metallic iron is greatly increased. Thereby the zinc is at all parts in contact with the iron, and thus its solution is facilitated, according to well-known principles. The partition-walls may be constructed and arranged in any desired manner, either radially or radially with transverse dividing-walls in the radial partitions or in any other desired or suitable manner.

In order to prevent an excess of alkali sulfid, the receptacle in which the reaction takes place is so connected with the feed-receptacle containing the alkali sulfid that the supply of said alkali sulfid is governed by the amount of hydrogen developed. For this purpose an automatic pressure-regulator is arranged in communication with the receptacle so as to permit the access of the hydrogen thereto and is connected with regulating means, such as a valve in the supply-pipe connecting the the alkali-sulfid receptacle with the receptacle in which the reaction takes place.

If it is desired to obtain caustic alkali and zinc sulfid simultaneously, zinc in excess is boiled with caustic alkali in the closed metallic receiver, iron filings being added for facilitating the evolution of hydrogen. Any suitable device may be employed for heating the receptacle—such as, for example, a double bottom, as shown—for the introduction of a heating medium, such as steam, a steam-coil, or the like.

In starting the process the desired amount of zinc is first dissolved and care is taken that undecomposed alkali hydrate is still present. Thereupon the alkali sulfid is gradually added, the stirring or agitating device being in constant motion in order to prevent the finely-divided suspended zinc sulfid from settling to the bottom. Hence during the course of the process zinc, caustic alkali, and alkali sulfid are simultaneously present in the reaction-receptacle. The supply of the alkali sulfid is so regulated that the amount of the same is just sufficient to form the zinc sulfid, and no excess of the same, which, as formerly stated, would be injurious, is present. After the reaction is completed only a portion of the contents of the receptacle is removed. The remainder (about one-fifth of the entire quantity) serves to insure the continuity of the reaction, and from now on it will be necessary to add only zinc and alkali sulfid for continuing the process.

As an example under my process I will now describe the manufacture of caustic soda. For this purpose metallic divided zinc is added to a caustic-soda solution of 35° Baumé strength, and sodium sulfid is then added. The reaction which follows proceeds according to the equation:

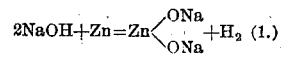
$$2NaOH + Zn = Zn\genfrac{}{}{0pt}{}{ONa}{ONa} + H_2 \quad (1.)$$

According to Equation 1 it will be noted zinc-sodium oxid $Zn(ONa)_2$ is first formed, which zinc-sodium oxid is in turn acted upon by the sodium sulfid to form zinc sulfid and sodium hydrate or caustic soda. This reaction proceeds according to the equation:

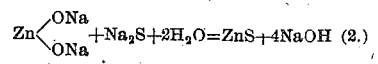
$$Zn\genfrac{}{}{0pt}{}{ONa}{ONa} + Na_2S + 2H_2O = ZnS + 4NaOH \quad (2.)$$

For the purpose of this reaction just sufficient sodium sulfid is added as is necessary to convert the zinc-sodium oxid into zinc sulfid and caustic soda. An excess of sodium sulfid would have the result that such excess would react upon the sodium hydrate in an undesired manner and would be attended by the formation of sodium sulfhydrate and hydrogen sulfid.

While I have hereinbefore described my process as applicable in connection with alkali hydrates, it is to be observed that it may be carried out also for the production of hydrates of the alkaline-earth metals, and for this purpose instead of the alkali hydrates and alkali sulfids the hydrates and the sulfids of alkaline-earth metals are to be employed and they are to be considered as the equivalents of the former. (Referred to in the specification and the claims.) For carrying out this process I have devised an apparatus which is especially suitable and which is illustrated in the accompanying drawings.

In the said drawings, Figure 1 is an elevation, partly in longitudinal vertical section, of such apparatus. Fig. 2 is a sectional plan on line A A of Fig. 1, one-half of the same being represented broken away; Fig. 3, a similar view showing a modified form of drum. Fig. 4 is a longitudinal vertical section of the regulating device.

$a$ is the receptacle in which the granulated zinc in excess and caustic alkali are heated by introducing steam or another medium into the double bottom $a'$.

$b$ is the rotary drum of a perforated bottom and similar walls. The drum is divided into compartments by perforated radial partition-walls $q$ and $r$, Fig. 2, or by radial partition-wall $t$ and transverse dividing-walls $u$, Fig. 3. Referring to Fig. 2, the partition-walls $r$ are extended to the axis, whereas the intermediate partitions $q$ reach only to the concentric partition-wall $s$. The drum $b$ is secured to a vertical shaft $c$, resting in the bottom bearing $c'$, intermediate bearing $c^2$, and upper bearing $c^3$. The upper end of the shaft $c$ has secured thereto a bevel-gear $d$, meshing with the bevel-gear $e$ on the shaft $e'$, to which is secured the fixed and loose pulleys $f f'$. By driving the pulley $f$ the rotation is transferred, by means of the gears $e d$, to the shaft $c$ and to the drum $b$.

The receptacle $a$ is hermetically closed by the cover $a^2$, through which the tubes $g$ and $h$ pass. The tube $h$ is supported by the bracket $h'$, connected to the bottom housing $i$ of the regulator, and may be opened or closed by the valve $m$, connected to the rod $l$. The rod $l$ is shiftably supported by the eye $l'$ of the arm $l^2$ and connected to the lever $k$, the fulcrum of which is at $k'$. The other end of the lever $k$ is connected to a float 1 by means of the rod 2 within the upper housing 3 of the regulator, which housing is supported by rods 4, resting on the bottom housing $i$. The bottom housing $i$ is connected with the upper housing 3 by means of a tube 5 and is filled with water to the level $y y$. The space above the level $y y$ is connected by the tube $g$ with the upper part of the receptacle $a$. The receptacle $v$, containing alkali sulfid, is connected to the housing of the valve $m$ by means of the tube $n$.

If hydrogen is disengaged in the receptacle $a$, it escapes through the tube $g$ into the bottom receptacle $i$ of the regulator and presses upon the water-surface, so that the water mounts through the tube 5 into the upper receptacle 3 and lifts the float 1, rod 2, and lever $k$, which will turn about its fulcrum $k'$, move down the rod 1, and press the valve $m$ on its seat, so that no alkali sulfid will be fed into the receptacle $a$. If the development of hydrogen begins to cease, the pressure acting upon the level $y y$ by the hydrogen gas becomes weaker. Then the float $l$ sinks down, turns the lever $k$, lifts the rod 1, and opens the valve $m$, so that alkali sulfid is fed through the tubes $n$ and $h$ into the receptacle $a$.

The zinc sulfid which is obtained with the employment of alkali hydrates is preferable, on account of its greater whiteness, to that obtained by employing the hydrates of the alkaline-earth metals, for the reason that, for example, when employing barium hydrate the zinc sulfid remains contaminated by the barium hydrate by reason of the low solubility of the latter.

The present process results in a very fine white zinc sulfid which is very impalpable and soft to the touch, and therefore possesses a much higher coating capacity than the products hitherto obtained. It is to be noted, moreover, that the resulting solutions of alkali hydrates or alkaline-earth hydrates are of a very high percentage. For example, a caustic-soda solution of a strength of 35° Baumé may be obtained directly by this process.

What I claim, and desire to secure by Letters Patent, is—

1. The process of manufacturing alkali hydrates, which consists in treating zinc in the presence of alkali hydrate with alkali sulfid.

2. The process of manufacturing alkali hydrates, which consists in heating zinc in excess in the presence of alkali hydrates with alkali sulfid.

3. The process of manufacturing alkali hydrates, consisting in heating zinc in the presence of alkali hydrates with alkali sulfid, which is added in a quantity no greater than necessary for transforming zinc-alkali oxid into zinc sulfid and caustic alkali.

4. The process of manufacturing alkali hydrates, consisting in treating zinc in excess in the presence of alkali hydrates with alkali sulfid, the alkali sulfid being added in a quantity no greater than necessary for transforming zinc-sodium oxid into zinc sulfid and caustic alkali.

5. The process of manufacturing alkali hydrates, which consists in treating zinc in the presence of alkali hydrate with alkali sulfid and keeping the precipitate in suspension.

6. The process of manufacturing alkali hydrates, which consists in heating zinc in excess in the presence of alkali hydrate with alkali sulfid and keeping the precipitate in suspension.

7. The process of manufacturing alkali hydrates, which consists in heating zinc in the presence of alkali hydrates with alkali sulfid, which is added in a quantity no greater than necessary for transforming zinc-alkali oxid into zinc sulfid and caustic alkali and keeping the precipitate in suspension.

8. The process of manufacturing alkali hydrates, which consists in treating zinc in excess in the presence of alkali hydrates with alkali sulfid, which is added in a quantity no greater than necessary for transforming zinc alkali into zinc sulfid and caustic alkali and keeping the precipitate in suspension.

In testimony whereof I have hereunto set my hand in presence of two subscribing witnesses.

CHARLES RANSON..

Witnesses:
   CHL. DE VOS,
   JUSENDE.